Patented May 13, 1952

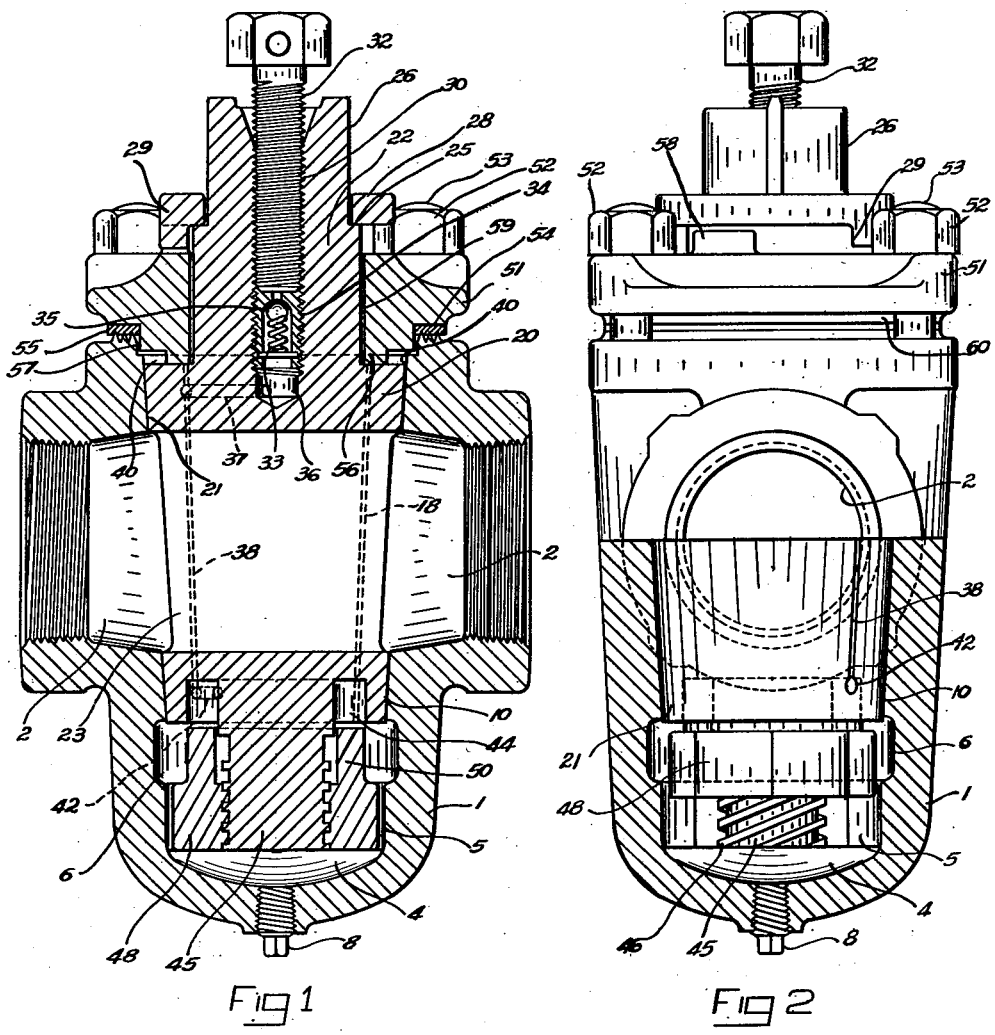

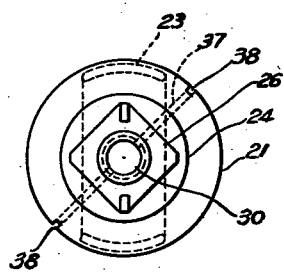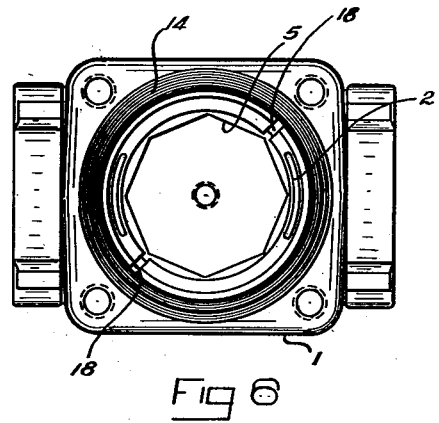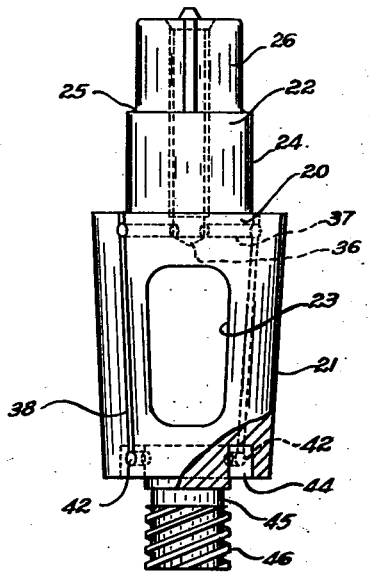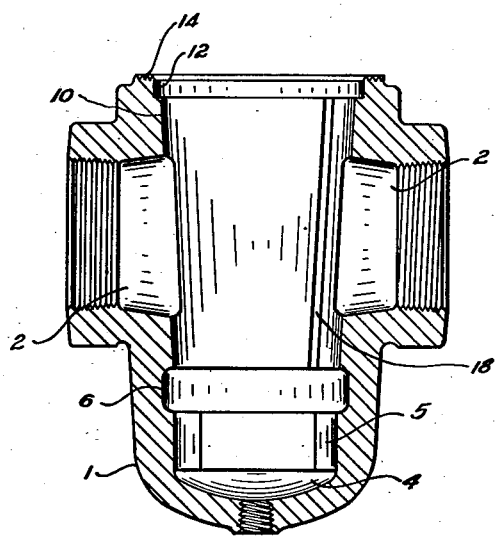

2,596,963

UNITED STATES PATENT OFFICE 2,596,963

LUBRICATED PLUG VALVE

Homer J. Waddell, Baltimore, and Albert H. Edmonds, Lancaster, Ohio, assignors, by mesne assignments, to The Waddell Manufacturing Company, Inc., a corporation of Ohio Application August 30, 1946, Serial No. 693,897

2 Claims. (Cl. 251—93)

This invention is directed to improvements in lubricated plug valves in which the valve surfaces are lubricated with each operation of the valve, the rotation of the valve forcing the lubricant over the valve seating surfaces. While in some respects the improved valves shown and described herein are similar to the valve shown in the prior patent to the applicant Homer J. Waddell, No. 2,244,928, dated June 10, 1941, the applicants here have improved upon the basic design of said prior patent in many important particulars.

One of the principal objects of the invention is to adapt the design of the earlier patent to a lubricating system by which the lubricant is circulated over the contacting surfaces of the plug and valve body and across the top of the plug to and from a main lubricant reservoir which is conveniently located in the base of the valve housing. This action effects a superior lubrication of the valve and conserves the lubricant.

The invention is illustrated in a form which constitutes an operative and practical lubricated valve embodying the principles of the invention. It will be understood, however, that the disclosures made herein are the best known and preferred form which has been designed to achieve the results set forth, but that the invention is not limited to the details of that form.

In the drawings:

Fig. 1 is a vertical section through one form of valve embodying the principles of the invention. In this view the valve is shown in open position.

Fig. 2 is a section taken at right angles to Fig. 1, but showing the valve in closed position. In this view the lower half of the valve body is shown in section.

Fig. 3 is a side elevation and Fig. 4 a plan view of the plug removed from the body.

Fig. 5 is a vertical section and Fig. 6 a plan view of the housing.

The invention is characterized by the provision of a plunger or piston in screw-threaded relation to the rotatable plug and so mounted that with each rotation of the plug the piston makes a complete stroke, up or down, in a receptacle or reservoir filled with the lubricant. The action of the piston forces a charge of the lubricant from the reservoir over the seating surfaces of the valve and returns it to the reservoir so that the surfaces are thoroughly lubricated and yet little of the lubricant is forced out into the flow passage. While it has been attempted to provide a lubricated valve in which the lubricant is circulated over the valve, none of these devices has been completely satisfactory, and the designs shown herein obviate the objectionable features of earlier designs of circulatory lubricating valves. In the drawings the plug and its seating surface are shown as conical in form, and although this is preferred, it is optional. Where the terms "upper" and "lower" are employed, these are relative merely as the valve may be located in any position.

The valve body 1 is of any usual or typical form, that shown herein having the oppositely positioned ports 2 which provide the flow passage through the body. The body is provided at its lower end with an enlarged chamber, indicated as a whole by the numeral 4, which may be termed the main lubricant reservoir. A portion of the wall of this chamber is formed with a non-circular cross-section so as to provide for the actuation of the piston in the manner to be described. In the drawings this portion of the reservoir is indicated at 5 and is shown as octagonal in form, although this particular configuration is optional.

Above the octagonal surfaces, the chamber is enlarged, as at 6, so as to give increased capacity for the lubricant chamber. The lower end of the chamber is provided with a clean-out passage, normally closed by a removable threaded plug 8.

From the upper end of the reservoir to a point close to the top, the body is formed with the machine finished valve seating surface 10 which is shown as conical with the larger portion of the surface toward the top of the valve. At the top of the seating surface, the valve body is cut away to provide a surface 12 angular in cross-section, in which the bonnet, to be described, is seated and centered. The upper edge of the body about the seat 12 is, in this form, toothed or serrated, as shown at 14, so as to provide a lubricant-tight seal about the upper end of the body. In the valve seating surface 10 are cut two vertical grooves or channels 18 which extend from the reservoir at 6 to the seat 12. These channels are located 180° apart and are close to the respective ports 2, as shown in Fig. 6.

The plug which constitutes the rotatable member of the valve is indicated as a whole at 20. The main or central portion of the plug is enlarged as is usual with valves of this type and is provided with a machined surface 21 fitting closely against the seat 10 in the valve body. A through passage 23 in the body of the plug registers with the passages 2 when the valve is open.

From the upper end of the plug body extends a stem 22. For some distance above the plug body the stem is circular, as indicated at 24, and then is reduced to provide a ledge 25 and the remainder of the stem is of any non-circular form to provide an engaging surface for a wrench by which the plug may be rotated. This tool-engaging surface is shown as square and is indicated by the numeral 26. Fitting over the portion 26 and resting upon the ledge 25 is a collar or stop ring 28 having an internal contour to correspond to the cross-section of the portion 26. From the underside of the collar extends the lug 29 which serves as a stop to limit the rotation of the plug to 90° from full open to full closed position.

Extending along the axis of the plug and from the top thereof to a point in the main body thereof just short of the passage 23 is the bore 30 which is threaded and constitutes the passage through which lubricant is provided to replenish the reservoir. The usual threaded grease plug screw 32 engages the bore 30. The lubricant is provided in the form of a stick which is loaded into the bore 30, and as the supply of lubricant in the valve diminishes, the screw 32 is turned down. In the drawing, the feed screw is shown at its lowermost position.

A check-valve assembly of any well known type is located at the bottom of the bore 30 so as to prevent any return of the lubricant. As shown in Fig. 1, a threaded plug 34 is provided which has a spring-held ball valve 35 located below a restricted port in the top of the plug 34 and held in place by a transverse pin 33. Below the plug the bore 30 is extended to provide a recess or chamber 36 which constitutes a small reservoir that receives the grease lubricant and distributes it to the passages which lead to the main lubricant reservoir 4.

From the chamber 36 two oppositely positioned, radial passages 37 extend through the body of the plug and discharge into vertical grooves or channels 38 on the seating surface of the plug. These grooves 38 extend to the top of the plug where they discharge lubricant into an annular channel or chamber 40 which surrounds the upper outside edge of the main body of the plug, it being noted that the body of the plug lies somewhat below the ledge 12. This arrangement provides a lubricant seal about the upper meeting surfaces of the plug body and the housing and permits lubricant to travel over the top of the plug body.

It will also be noted that each channel or groove 38 lies to one side of the through passage 23 so that each port 2 always lies between a channel 18 on the valve body and a channel 38 on the plug. This completes the lubricant seal about the ports. Also it will be noted that the grooves 38 are so located in the plug that during the 90° movement in opening or closing the valve, the grooves 38 wipe over the solid wall of the valve body and never pass over the ports 2. This prevents any loss of lubricant which would occur if the grooves were at any time in register with the ports 2.

The lower ends of the grooves 38 stop short of the lower end of the valve body, at which point they are in communication with two transverse, connecting radial passages 42 which conduct the grease to an annular pocket or chamber 44 cut into the lower under surface of the plug body. The vertical walls of this chamber are finished so that they have a relatively close sliding contact with the piston, to be described.

On the axis of the plug is provided the depending stem or extension 45 which projects downwardly into the chamber 4. The outer surface of this extension is cut with a relatively steep thread 46 over most of its length. This is preferably a square cut, multiple thread and its pitch is dependent upon the extent to which the piston is to move in a quarter turn of the plug. In all types of valves, the thread is designed to impart a substantial travel to the piston during the short arcuate movement of 90° required to open and close the valve.

The piston or plunger is designated by the numeral 48. It is threaded on the extension 45 and its outer surface is formed as a polygon roughly fitting the socket 5 formed in the inner wall of the main reservoir. As shown in Fig. 1, this is a loose fit so that grease may flow around the piston, but it is sufficient to constitute a key between the piston and the body so that the piston will rise and fall in the reservoir as the plug is turned. The upper surface of the piston is provided with an annular, upstanding rib 50, the walls of which are finished so that they have a close sliding fit with the walls of the pocket 44, at least sufficiently close so that grease trapped within the chamber 44 will be forced by the upward movement of the piston through the grease grooves and passage over the valve seating surfaces. It will be noted from Fig. 1 that when the valve is fully opened, the upper surface of the rib 50 lies slightly below the entrance to the pocket 44 so that the valve will turn over a short arc before the piston enters the pocket. This distance in the open position of the valve may be of any depth, depending upon the amount of lubricant which it is desired to circulate over the valve surfaces.

The plug is held in the plug body by what is known in the trade as a bonnet. The bonnet is indicated by the numeral 51 and is forced against the valve body by nuts 52 threaded on bolts 53 set into the valve body. The bonnet has an outer flange 54 which overlies the surface 14 on the valve body. The contacting surfaces may be smoothly finished to provide a metal-to-metal seal, but in the form shown in Figs. 1 to 6, a compressible gasket 55 is interposed between the bonnet and the valve body and is forced into the sharp toothed formations 14 to make a grease-proof seal at this point. The bonnet is formed with a depending rib 56 which bears against the upper surface of the valve body and holds the plug to its seat in the body and with wall 57 which fits within the seat 12 on the valve body. It is noted that the rib 56 is somewhat narrower than the upper surface of the valve body so as to provide the space for the grease chamber 40.

The upper surface of the bonnet is formed with two lugs 58 spaced 90° apart between which the lug 29 moves to limit the movement of the plug at fully open and fully closed positions. The center of the bonnet is formed with the axial passage 59 to receive the stem 24 of the plug.

The operation of this embodiment of the invention may be briefly described. Assuming that the valve is fully opened and the various lubricant chambers and channels are filled with the plastic grease commonly used in valves of this type, the piston 48 is at the lowermost point of its travel in the position shown in Fig. 1. Escape of the line fluid around the seating surfaces is effectually prevented by the complete grease seal afforded by the grease-filled channels 18, 38 and 40. As the operator turns the plug to close the valve, the piston rises and the rib 50 enters the pocket 44 so that grease is forced through the passage 42 and up the grooves 38 to the chamber 40. Thence it is forced down the grooves 18 and into the chamber 6.

When the valve is opened, the piston is moved downwardly by the threads on the extension 45 and this displaces grease in the chamber 4 which is forced upwardly along the grooves 18 into the chamber 40, over the top of the plug and into the grooves 38 by which it is returned to the chamber 44 and thence to the main reservoir. While there is some clearance between the walls of the pocket 44 and the walls of the rib 50, sufficient compression is exerted upon the grease to cause it to circulate over the valve surfaces during the opening and closing movements of the valve. After several operations of the valve, the entire body of grease will have made a complete circuit over the valve seating surfaces and across the top of the valve in moving to and from the chamber 4. While some grease is certain to be lost through seepage into the ports 2, this will be found to be a negligible amount for the grease will tend to return to the chamber 4 as the movement of the piston to and fro creates a drag or suction on the lubricant so that it does not tend to escape so easily. The supply may, of course, be replenished from time to time by operating the feed screw 32. The circulation of the lubricant serves to scavenge the valve seating surfaces and any foreign particles carried by the lubricant tend to settle in the bottom of the chamber 4 where they may be expelled by removing the plug 8 and forcing a charge of fresh lubricant into the system.

The embodiment of the invention has been described in great detail, but these details are not essential and may be varied or modified within the scope of the invention as set forth in the appended claims.

What is claimed is:

1. A lubricated plug valve comprising a valve body having a valve seat, a rotatable plug in the seat, a lubricant reservoir on the body at one side of the seat, two sets of lubricating channels in the contacting surfaces of the plug and the seat, one set of channels being in direct communication with the reservoir, a pocket in an end of the plug and opening into the reservoir, the other set of channels being in communication with the pocket, a lubricant passage connecting the sets of channels at a point remote from the reservoir, and a piston movable in opposite directions in the reservoir with the opening and closing of the valve respectively, one side of the piston having a projection adapted to enter the pocket when the piston is moved in one direction, the other side of the piston adapted to force the lubricant through the set of channels in direct communication with the reservoir when the piston is moved in the opposite direction.

2. A lubricated plug valve comprising a valve body having a valve seat, a rotatable plug in the seat, a lubricant reservoir on the body at one side of the seat, two sets of lubricating channels in the contacting surfaces of the plug and the seat, one set of channels being in direct communication with the reservoir, a pocket in an end of the plug and opening into the reservoir, the other set of channels being in communication with the pocket, a lubricant passage connecting the sets of channels at a point remote from the reservoir, a threaded stem on the plug, a piston located in the reservoir and threaded on the stem, one side of the piston having a projection adapted to enter the pocket when the plug is rotated in one direction, and means to permit lubricant in the reservoir to pass from the reservoir to the set of channels in direct communication with the reservoir when the plug is rotated in the opposite direction.

HOMER J. WADDELL.
ALBERT H. EDMONDS.

REFERENCES CITED

The following references are of record in the file of this patent:

UNITED STATES PATENTS

| Number | Name | Date |
|---|---|---|
| Re. 17,724 | Nordstrom | July 8, 1930 |
| 1,387,714 | Heylman | Aug. 16, 1921 |
| 1,910,947 | Coffman | May 23, 1933 |
| 2,066,250 | Clark | Dec. 29, 1936 |
| 2,169,525 | Goldberg | Aug. 15, 1939 |
| 2,244,928 | Waddell | June 10, 1941 |
| 2,329,981 | Church | Sept. 21, 1943 |
| 2,331,362 | Waddell | Oct. 12, 1943 |